United States Patent
Ellsworth et al.

(10) Patent No.: US 11,360,654 B2
(45) Date of Patent: Jun. 14, 2022

(54) SUMMARY SHAPES

(71) Applicant: Lucid Software, Inc., South Jordan, UT (US)

(72) Inventors: Kevin Michael Ellsworth, Sandy, UT (US); Kevin Joseph Reece, South Jordan, UT (US); Jonathan Bronson, Salt Lake City, UT (US); Aditya More, South Jordan, UT (US); Alexander R. Williams, Vineyard, UT (US)

(73) Assignee: LUCID SOFTWARE, INC., South Jordan, UT (US)

( * ) Notice: Subject to any disclaimer, the term of this patent is extended or adjusted under 35 U.S.C. 154(b) by 0 days.

(21) Appl. No.: 17/076,685

(22) Filed: Oct. 21, 2020

(65) Prior Publication Data

US 2022/0121351 A1 Apr. 21, 2022

(51) Int. Cl.
*G06F 3/048* (2013.01)
*G06F 3/04845* (2022.01)
*G06F 3/0482* (2013.01)

(52) U.S. Cl.
CPC ........ *G06F 3/04845* (2013.01); *G06F 3/0482* (2013.01)

(58) Field of Classification Search
CPC .......................... G06F 3/0482; G06F 3/04845
See application file for complete search history.

(56) References Cited

U.S. PATENT DOCUMENTS

| | | | |
|---|---|---|---|
| 6,606,105 B1 * | 8/2003 | Quartetti | G06F 3/0481 715/203 |
| 10,175,854 B2 | 1/2019 | Ramanathan et al. | |
| 2007/0157097 A1 | 7/2007 | Peters | |
| 2007/0209022 A1 | 9/2007 | Gourdol et al. | |
| 2010/0077336 A1 | 3/2010 | Ording et al. | |
| 2012/0262480 A1 | 10/2012 | Christensen et al. | |
| 2013/0239060 A1 | 9/2013 | Kang et al. | |
| 2013/0283175 A1 * | 10/2013 | Faridian | H04L 41/12 715/736 |
| 2020/0004865 A1 | 1/2020 | Dilts et al. | |
| 2020/0004866 A1 | 1/2020 | Dilts et al. | |
| 2020/0004872 A1 | 1/2020 | Dilts et al. | |
| 2020/0272608 A1 | 8/2020 | Dilts et al. | |

OTHER PUBLICATIONS

International Search Report and Written Opinion issued in corresponding application No. PCT/US2021/055884, dated Feb. 15, 2022.

\* cited by examiner

*Primary Examiner* — Claudia Dragoescu
(74) *Attorney, Agent, or Firm* — Maschoff Brennan

(57) ABSTRACT

In an example, a method to display a graphical diagram includes displaying multiple graphical objects in a graphical drawing canvas. The graphical objects represent multiple nodes identified in structured source data. The method includes receiving first input effective to group first and second graphical objects of the multiple graphical objects based on a property of the nodes. The method includes replacing the first and second graphical objects with a summary graphical object in the graphical drawing canvas in response to receiving the first input.

21 Claims, 8 Drawing Sheets

SUMMARY SHAPES

FIELD

The embodiments discussed herein are related to summary shapes.

BACKGROUND

Unless otherwise indicated herein, the materials described herein are not prior art to the claims in the present application and are not admitted to be prior art by inclusion in this section.

Some structured source data, e.g., of networks, organizations, or other structured source data, lends itself to representation in the form of a diagram or other visualization, such as a network diagram or an organizational chart. Some diagram applications allow users to generate graphical diagrams on a computer based on the structured source data.

Some structured source data may identify a large number of nodes, such as hundreds or even thousands of nodes, each of which may be represented by a graphical object in a graphical diagram. With such a large number of nodes, the graphical diagram may be so detailed that it may be distracting to a user. In particular, graphical diagrams that include a large number of nodes may provide so much detail that they are distracting to users in at least some circumstances, such as when the users are more interested in a high-level visualization of the structured source data than a detailed view.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a method to display a graphical diagram includes displaying multiple graphical objects in a graphical drawing canvas. The graphical objects represent multiple nodes identified in structured source data. The method includes receiving first input effective to group first and second graphical objects of the multiple graphical objects based on a property of the nodes. The method includes replacing the first and second graphical objects with a summary graphical object in the graphical drawing canvas in response to receiving the first input.

In another example embodiment, a non-transitory computer-readable medium has computer-readable instructions stored thereon that are executable by a processor to perform or control performance of operations. The operations include displaying multiple graphical objects in a graphical drawing canvas. The graphical objects represent multiple nodes identified in structured source data. The operations include receiving first input effective to group first and second graphical objects of the multiple graphical objects based on a property of the nodes. The operations include replacing the first and second graphical objects with a summary graphical object in the graphical drawing canvas in response to receiving the first input.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Some embodiments described herein collapse multiple graphical objects corresponding to multiple nodes into a fewer number of summary graphical objects to, e.g., remove what may be a distracting level of detail in at least some circumstances. Two or more graphical objects that are collapsed into a summary graphical object may be grouped according to a property of the underlying node of the graphical object. For example, graphical objects whose underlying nodes have a property with a particular value may be grouped together and collapsed into a summary graphical object. While described in terms of grouping and summarizing two or more graphical objects, embodiments described herein may alternatively or additionally "group" and "summarize" a single graphical object. For example, if only a single graphical object is identified as belonging to a group, the single graphical object may be replaced by a summary graphical object that optionally indicates the "group" has a single member.

The process of grouping and collapsing graphical objects into fewer summary graphical objects may be referred to herein as summarizing or summarization. Summarization may be reversible, e.g., in response to appropriate input through a UI to turn summarization off. When summarization is turned off, a summary graphical object may be expanded into the graphical objects that were previously grouped and collapsed into the summary graphical object.

Some graphical diagrams include connectors between graphical objects to indicate relationships between the graphical objects. When a graphical object of a group for collapse is connected by a connector to a graphical object outside of the group and the group is collapsed, the connector may be replaced by a connector between the resulting summary graphical object and the graphical object outside the group. Alternatively or additionally, when one or more graphical objects of the group have conditional formatting and the group is collapsed into the summary graphical object, the conditional formatting may be applied to the summary graphical object.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1:
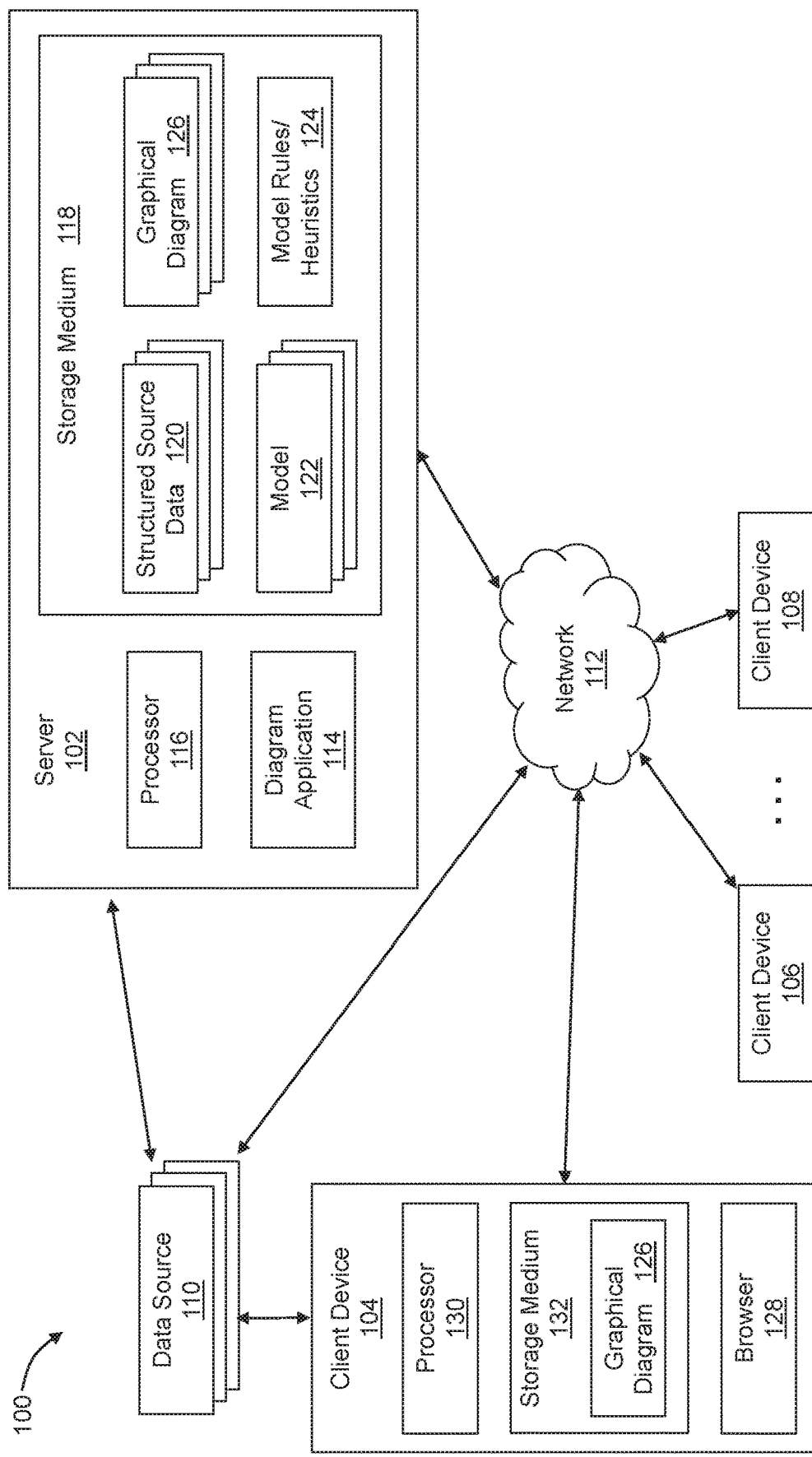
FIG. 1 is a block diagram of an example operating environment that includes a server 102 and one or more client devices.

FIG. 1 is a block diagram of an example operating environment 100 that includes a server 102 and one or more client devices 104, 106, 108, arranged in accordance with at least one embodiment described herein. The server 102 and/or the client devices 104, 106, 108 may be configured to generate and display graphical diagrams or visualizations that include graphical objects based on structured source data. The terms graphical diagram and visualization are used interchangeably herein. In some embodiments, the server 102 and/or the client devices 104, 106, 108 may be configured to collapse multiple graphical objects into fewer summary graphical objects within a graphical diagram.

The structured source data may be received from one or more data sources 110. Each of the data sources 110 may include, for example, a human resources (HR) system or database such as BAMBOOHR or WORKDAY; a customer relationship management (CRM) system such as SALESFORCE.COM or MICROSOFT DYNAMICS CRM; a spreadsheet for HR, e.g., with names, pictures, and/or a reporting structure for employees of an entity; a custom internal logging system; a floorplan database (e.g., with employee office/workstation assignments); a cloud infrastructure provider such as AWS, GOOGLE CLOUD, or MICROSOFT AZURE; a database schema (e.g., to generate Entity Relationship Diagrams); a service-oriented architecture; physical network discovery tools; custom-built technical systems that can be modeled similar to a network; or other suitable data source and/or data collection. The data in each of the data sources 110 may have a specific format, which may be different and/or the same from one data source 110 to another. Some example data formats include proprietary formats, Structured Query Language (SQL), and JavaScript Object Notation (JSON).

The structured source data may identify two or more nodes or other entities and relationships among them. For instance, the structured source data may identify employees, executives, owners and/or other personnel of a company as well as their relationships to each other, such as relative ranks and organization into one or more divisions, departments, or other logical units. As another example, the structured source data may identify various compute nodes, storage nodes, database nodes, networking nodes, and/or other entities deployed by a customer in AWS as well as relationships among the entities, such as specific ports over which specific nodes can communicate. As another example, the structured source data may identify databases and tables within databases and/or other entities in a database schema as well as relationships among the entities, such as foreign and/or primary keys.

Each graphical diagram may graphically represent one or more of the nodes using one or more graphical objects. In particular, each node may be represented by or otherwise associated with a set of one or multiple graphical objects. For example, compute nodes and database nodes of AWS structured source data may each be represented by a corresponding graphical node in a graphical diagram. As another example, a node of an employee or other individual in an organization may be graphically represented by a box or other shape outline (e.g., a first graphical object), a photo of the employee (e.g., a second graphical object), text (e.g., a third graphical object) that may include the employee's name, office location, and/or other information, and/or a connector (e.g., a fourth graphical object) that indicates the employee's supervisor or manager or other individual the employee reports to.

The server 102 and/or the client devices 104, 106, 108 may be configured to automatically generate graphical diagrams based on the structured source data 120. The graphical diagrams may be generated based on contract maps. Alternatively or additionally, automatically-generated graphical diagrams or graphical objects therein may be customized by application of conditional formatting. In some embodiments, updates made to the graphical drawings, e.g., to graphical objects within the graphical drawings that represent the nodes, may be propagated back to the structured source data in some circumstances. Alternatively or additionally, the server 102 and/or the client devices 104, 106, 108 may be configured to apply one or more reversible data transforms to the structured source data when generating graphical diagrams. Additional details regarding contract maps, customization of graphical diagrams, conditional formatting, updating structured source data, and reversible data transforms are disclosed in the following U.S. patent documents which are incorporated herein by reference in their entireties: U.S. Patent Pub. No. 20200004865 (U.S. application Ser. No. 16/024,533, filed Jun. 29, 2018), U.S. Patent Pub. No. 20200004866 (U.S. application Ser. No. 16/024,544, filed Jun. 29, 2018), U.S. Patent Pub. No. 20200004872 (U.S. application Ser. No. 16/024,551, filed Jun. 29, 2018), and U.S. application Ser. No. 16/796,757, filed Feb. 20, 2020.

Although one server 102 and three client devices 104, 106, 108 are illustrated in FIG. 1, the operating environment 100 may more generally include one or more servers 102 and one or more client devices 104, 106, 108. In these and other embodiments, the operating environment 100 may include other servers and/or devices not illustrated in FIG. 1.

The operating environment 100 may additionally include a network 112. In general, the network 112 may include one or more wide area networks (WANs) and/or local area networks (LANs) that enable the server 102, the client devices 104, 106, 108, and the data sources 110 to communicate with each other. In some embodiments, the network 112 may include the Internet, including a global internetwork formed by logical and physical connections between multiple WANs and/or LANs. Alternately or additionally, the network 112 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 112 may also include servers that enable one type of network to interface with another type of network.

In general, the server 102 may host a web-based diagram application (hereinafter application) 114 that allows the client devices 104, 106, 108 to generate and display graphical diagrams, collapse multiple graphical objects into fewer summary graphical objects, and expand summary graphical objects into more graphical objects. In other embodiments, the application 114 may include a non-web-based application but may generally be described herein as a web-based application for simplicity.

The server 102 may additionally include a processor 116 and a storage medium 118. The processor 116 may be of any type such as a central processing unit (CPU), a microprocessor (µP), a microcontroller (µC), a digital signal processor (DSP), or any combination thereof. The processor 116 may be configured to execute computer instructions that, when executed, cause the processor 116 to perform or control performance of one or more of the operations described herein with respect to the server 102.

The storage medium 118 may include any non-transitory computer-readable medium, including volatile memory such as random access memory (RAM), persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 118 may store computer instructions that may be executed by the processor 116 to perform or control performance of one or more of the operations described herein with respect to the server 102.

The storage medium 118 may additionally store one or more sets of structured source data 120, one or more models 122, model rules and/or heuristics 124 ("Model Rules/Heuristics" in FIG. 1), and/or one or more graphical diagrams 126. Each set of structured source data 120 may be imported from a corresponding one of the data sources 110. The structured source data 120 may be imported over the network 112 or directly from the corresponding data source 110 if a direct connection exists.

The model rules and/or heuristics 124 include rules and/or heuristics that may be applied to the structured source data 120 to derive information about the nodes and/or their relationships represented in the structured data. The structured source data 120 and/or the information derived by the model rules and/or heuristics 124 may be used by the server 102 to generate the models 122, each model 122 corresponding to a different set of structured source data 120. Each of the graphical diagrams 126 may be generated directly from a corresponding set of the structured source data 120 and/or from a corresponding one of the models 122 derived from the corresponding set of structured source data 120. The graphical diagrams 126 may be generated based on input received from users at the client devices 104, 106, 108 and may include some or all of the nodes or other entities represented in the corresponding set of structured source data 120 and/or in the corresponding model 122 derived from the corresponding set of structured source data 120.

Some structured source data 120 may identify a large number of nodes, such as hundreds or even thousands of nodes, the extent of and relationships between which may be so detailed they may be distracting to a user. In particular, graphical diagrams that include a large number of nodes may provide so much detail that they are distracting to users in at least some circumstances, such as when the users are more interested in a high-level visualization of the structured source data than a detailed view.

Accordingly, some embodiments described herein collapse multiple graphical objects corresponding to multiple nodes into a fewer number of summary graphical objects to, e.g., remove what may be a distracting level of detail in at least some circumstances. Two or more graphical objects that are collapsed into a summary graphical object may be grouped according to a property of the underlying node of the graphical object. For example, graphical objects whose underlying nodes have a property with a particular value may be grouped together and collapsed into a summary graphical object.

In some embodiments, the server 102 may be configured to cooperate with the client devices 104, 106, 108 to allow the client devices 104, 106, 108 to generate and display graphical diagrams 126 and group and collapse graphical objects therein based on the structured source data 120. Generating and displaying graphical diagrams 126 or grouping and collapsing graphical objects based on the structured source data 120 may include generating and/or displaying the graphical diagrams 126 or grouping and/or collapsing graphical objects based directly on the structured source data 120 and/or based on the models 122 derived from the structured source data 120. In these and other embodiments, client devices 104, 106, 108 may use a corresponding application or app, such as a browser 128, to generate the graphical diagrams 126, which may be displayed on a display of the corresponding client device 104, 106, 108.

Accordingly, each of the client devices 104, 106, 108 may execute an application, such as the browser 128, configured to communicate through the network 112 with the server 102. The browser 128 may include an Internet browser or other suitable application for communicating through the network 112 with the server 102. The browser 128 may generate, download and/or interact with structured source data 120 and/or graphical diagrams 126. Each of the client devices 104, 106, 108 may include a desktop computer, a laptop computer, a tablet computer, a mobile phone, a smartphone, a personal digital assistant (PDA), a wearable device (e.g., a smart watch), or another suitable client device.

Each of the client devices 104, 106, 108 may additionally include a processor and a storage medium, such as a processor 130 and a storage medium 132 as illustrated for the client device 104 in FIG. 1. Each of the other client devices 106, 108 may be similarly configured. Similar to the processor 116 of the server 102, the processor 130 may be of any type such as a CPU, a µP, a µC, a DSP, or any combination thereof. The processor 130 may be configured to execute computer instructions that, when executed, cause the processor 130 to perform or control performance of one or more of the operations described herein with respect to the client device 104 and/or the browser 128.

Similar to the storage medium 118 of the server 102, the storage medium 132 of the client device 104 may include any non-transitory computer-readable medium, including volatile memory such as RAM, persistent or non-volatile storage such as ROM, EEPROM, CD-ROM or other optical disk storage, magnetic disk storage or other magnetic storage device, NAND flash memory or other solid state storage device, or other persistent or non-volatile computer storage medium. The storage medium 132 may store computer instructions that may be executed by the processor 130 to perform one or more of the operations described herein with respect to the client device 104 and/or the browser 128. The storage medium 132 may additionally store, at least temporarily, a graphical diagram 126, some of a corresponding set of structured source data 120 or model 122, and/or other content obtained from the server 102 and/or generated locally on the client device 104.

Embodiments described herein are not limited to using a browser to communicate with the server 102 to generate and display graphical diagrams 126 and group and collapse graphical objects therein. For example, rather than or in addition to a browser, the client devices 104, 106, 108 may include a native app as are often used on client devices such as mobile devices including smartphones and tablet computers. Accordingly, embodiments described herein generally include generating and displaying graphical diagrams and grouping and collapsing graphical objects therein using a browser, a native app, or another suitable application on the client devices 104, 106, 108.

As already mentioned, some embodiments described herein group two or more graphical objects for collapse to a summary graphical object based on a property of the underlying nodes represented by the graphical objects. The property may include any property of the nodes that is included in the structured source data 120. For example, AWS structured source data may include or identify multiple EC2 instances as nodes, where the entity type, e.g., having a particular value of EC2 instance in this case, is an example of one property. In addition, each of the EC2 instances has an instance type such as T3a or T2 where the instance type, e.g., having a particular value of T3a or T2, is an example of another property. Thus, all EC2 instances may be grouped together if the entity type property having a particular value of EC2 instance is used to perform the grouping. Alternatively, all T3a instances may be grouped together if the instance type property having a particular value of T3a is used to perform the grouping.

Grouping graphical objects based on a property of underlying nodes may allow a user to quickly and easily group a large (or any other size) set of graphical objects based on a property of the underlying nodes in the structured source data 120. In general, for instance, the user may navigate a UI on the client device 104 to select the property and to specify a particular value of the property to group all graphical objects representing nodes that have the particular value for the property in the group for collapse to a summary graphical object.

Alternatively or additionally, the user may navigate the UI on the client device 104 to select the property without specifying a particular value to quickly and easily group graphical objects into multiple groups based on values of the property of the underlying nodes in the structured source data 120. For example, if the user selects the property without specifying a value, all graphical objects that represent underlying nodes that have a first value for the property may be grouped and summarized by a first summary graphical object, all graphical objects that represent underlying nodes that have a second value for the property may be grouped and summarized by a second summary graphical object, and so on.

Alternatively or additionally, a user may desire to group graphical objects that represent nodes with different properties in the structured source data 120 or independent of properties in the structured source data 120 for collapse to a summary graphical object. Accordingly, the user may individually select each of the desired graphical objects to include in the group and the property based on which the graphical objects are grouped may include an indication of selection of the graphical objects by the user. In this example, the graphical objects that are individually selected may be grouped for collapse to a summary graphical object.

In some examples, graphical objects that represent nodes may be connected by lines or other connectors to indicate relationships between the nodes. If a first graphical object included in the group for collapse to a summary graphical object is connected by a connector to a second graphical object not included in the group to indicate such a relationship, the connector between the first and second graphical objects may be replaced by a connector between the summary graphical object and the second graphical object when the group of graphical objects is replaced by the summary graphical object.

Some graphical objects may have conditional formatting. In this and other examples, graphical objects may have a default format. For example, each EC2 instance may be represented by the same icon or other graphical object with a default format. Conditional formatting may alter an aspect of a given graphical object if the underlying node has a property that satisfies a condition. For example, in the case of EC2 instances, a badge icon or other icon may be added to or included with the default EC2 instance graphical object if the underlying EC2 instance has a property that satisfies the condition.

When a graphical object included in a group for collapse has conditional formatting, the conditional formatting may be applied to the corresponding summary graphical object when the group is collapsed to the summary graphical object. If the group includes graphical objects with different conditional formatting, each of the different conditional formattings of members of the group may be applied to the summary graphical object.

In some embodiments, the graphical diagrams 126 may include containers within which some or all of the graphical objects may be organized based on the structured source data 120. For example, AWS structured source data may organize EC2 instances and/or other resources into virtual private clouds (VPCs). Each VPC may include one or more of an application load balancer node, a network address translation (NAT) gateway node, an EC2 instance, or other node(s). A graphical diagram for such structured source data may include multiple VPC containers, e.g., one VPC container for each VPC. As an example, a VPC container may include a first graphical object to represent an application load balancer node, second-fourth graphical objects to represent three EC2 instances, and a fifth graphical object to represent a NAT gateway node.

In these and other embodiments, at least some container levels within the graphical diagrams 126 may be turned on/off by a user. When a container level is turned on, container(s) at that container level is/are included in the graphical diagram and any graphical objects that represent nodes associated with the container in the structured source data are shown within the container in the graphical diagram 126. When a container level is turned off, container(s) at that container level is/are not included in the graphical diagram and any graphical objects that represent nodes associated with the container in the structured source data are not shown within the container in the graphical diagram 126.

In some embodiments, summarization, e.g., replacement of a group of graphical objects by a summary graphical object, occurs within containers and not across containers. For example, if the nodes represented by first and second graphical objects in a first container and the nodes represented by third and fourth graphical objects in a second container share a common property, e.g., have the same value for a given property, the first and second graphical objects may be replaced by a first summary graphical object in the first container while the third and fourth graphical objects may be replaced by a second summary graphical object in the second container.

Consider the case where one container level is turned on and summarization based on the property is performed to generate multiple summary graphical objects, e.g., one summary graphical object in each of multiple containers at that container level. If the container level is then turned off, all of the graphical objects from the multiple containers at that container level are no longer organized into separate containers and may therefore be collapsed into a single summary graphical object.

As another example, consider the case where after summarization with one container level turned on, the container level is turned off and another container level is turned on. In this example, summarization may be performed anew in view of the new containers. For example, assume that at a first container level, first and second graphical objects belong to a first container and are collapsed to a first summary graphical object and third and fourth graphical objects belong to a second container and are collapsed to a second summary graphical object. Further assume that at a second container level, the first and third graphical objects belong to a third container while the second and third graphical objects belong to a fourth container. When the first container level is turned off and the second container level is turned on, the graphical objects may be re-summarized within the new containers such that the first and third graphical objects are collapsed within the third container to a third summary graphical object and the second and fourth graphical objects are collapsed within the fourth container to a fourth summary graphical object.

Figure 2:
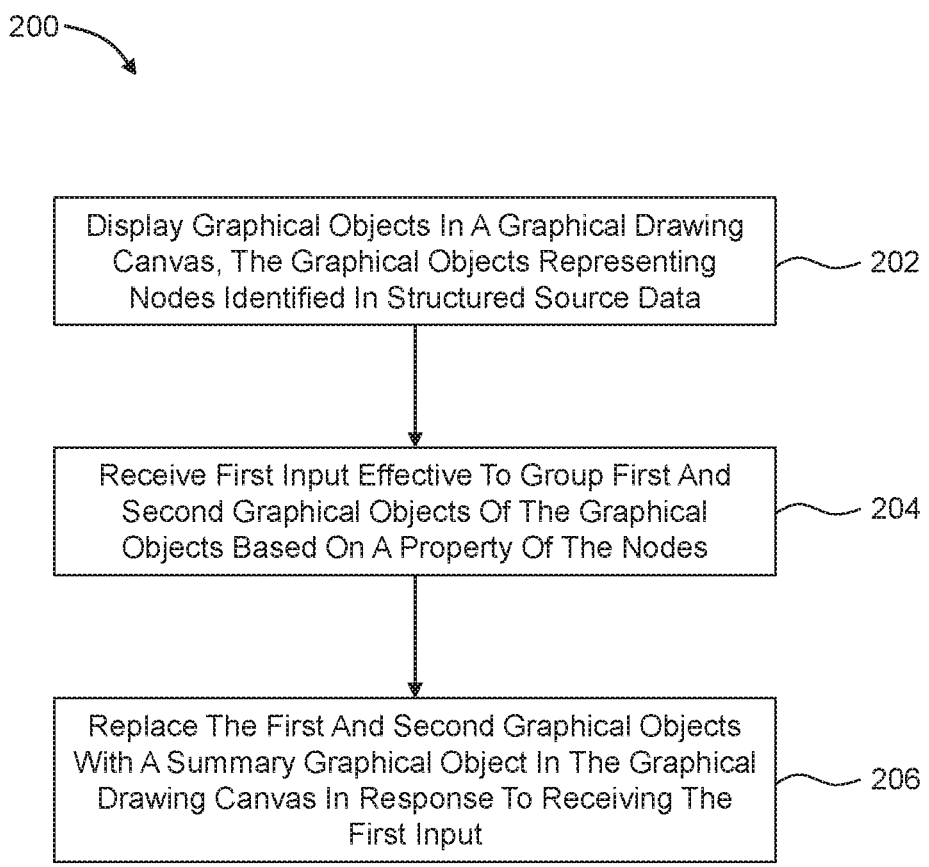
FIG. 2 is a flowchart of a method to display a graphical diagram.

FIG. 2 is a flowchart of a method 200 to display a graphical diagram, arranged in accordance with at least one embodiment described herein. The method 200 may be programmably performed or controlled by a processor in, e.g., a computer and/or server that executes a browser, diagram application, and/or other application to generate graphical diagrams based on structured data. In an example implementation, the method 200 may be performed in whole or in part by the server 102 and/or the client device 104 of FIG. 1. The method 200 may include one or more of blocks 202, 204, and/or 206.

At block 202, the method 200 may include displaying multiple graphical objects in a graphical drawing canvas. The graphical objects may represent multiple nodes identified in structured source data, such as the structured source data 120 of FIG. 1. Block 202 may be followed by block 204.

At block 204, the method 200 may include receiving first input effective to group first and second graphical objects of the multiple graphical objects based on a property of the nodes. Receiving the first input may include receiving input effective to select the property and to specify a particular value of the property. In this and other examples, the first and second graphical objects may represent first and second nodes of the plurality of nodes and a value of the property of each of the first and second nodes may be the particular value. Alternatively or additionally, receiving the first input may include receiving an individual selection of the first graphical object and an individual selection of the second graphical object. In this and other examples, the property may include an indication of selection of each of the first and second graphical objects. Block 204 may be followed by block 206.

At block 206, the method 200 may include replacing the first and second graphical objects with a summary graphical object in the graphical drawing canvas in response to receiving the first input. In some examples, the first graphical object includes first conditional formatting replacing the first and second graphical objects with the summary graphical object in the graphical drawing canvas may include applying the first conditional formatting to the summary graphical object. Alternatively or additionally, the second graphical object may include second conditional formatting and replacing the first and second graphical objects with the summary graphical object in the graphical drawing canvas may further include applying the second conditional formatting to the summary graphical object such that the summary graphical object has both the first and second conditional formatting.

One skilled in the art will appreciate that, for this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

For example, the method 200 may further include expanding the summary graphical object back into the first and second graphical objects response to corresponding user input. In particular, the method 200 may further include receiving second input effective to expand the summary graphical object and replacing the summary graphical object in the graphical drawing canvas with the first and second graphical objects in response to receiving the second input.

In some examples, the graphical objects further includes a third graphical object not grouped with the first and second graphical objects. Prior to replacement of the first and second graphical objects with the summary graphical object at block 206, the first graphical object may be coupled by a connector to the third graphical object in the graphical drawing canvas. In this and other examples, the method 200 may further include replacing the connector between the first graphical object and the third graphical object with a connector between the summary graphical object and the third graphical object in the graphical drawing canvas when the first and second graphical objects are replaced by the summary graphical object.

Alternatively or additionally, the graphical objects may further include third and fourth graphical objects, the graphical diagram may include first and second containers, the first and second graphical objects may be positioned within the first container and the third and fourth graphical objects may be positioned within the second container. The first input may be further effective to group the third and fourth graphical objects with the first and second graphical objects. In this and other examples, replacing the first and second graphical objects with the summary graphical object in the graphical drawing canvas at block 206 may include replacing the first and second graphical objects in the first container with a first summary graphical object in the first container. The method 200 may further include replacing the third and fourth graphical objects in the second container with a second summary graphical object in the second container.

In some embodiments, the method 200 may further include receiving container input effective to turn off a container level that includes the first and second containers such that they are removed from the graphical diagram and replacing the first and second summary graphical objects with a single summary graphical object.

Alternatively or additionally, the method 200 may further include receiving first container input effective to turn off the container level that includes the first and second containers such that they are removed from the graphical diagram. The method 200 may further include receiving second container input effective to turn on another container level that includes third and fourth containers such that they are included in the graphical diagram. The first and third graphical objects may belong to the third container and the second and fourth graphical objects may belong to the fourth container. The method 200 may further include displaying a third summary graphical object in the third container that represents the first and third graphical objects and a fourth summary graphical object in the fourth container that represents the second and fourth graphical objects.

Figure 3A:
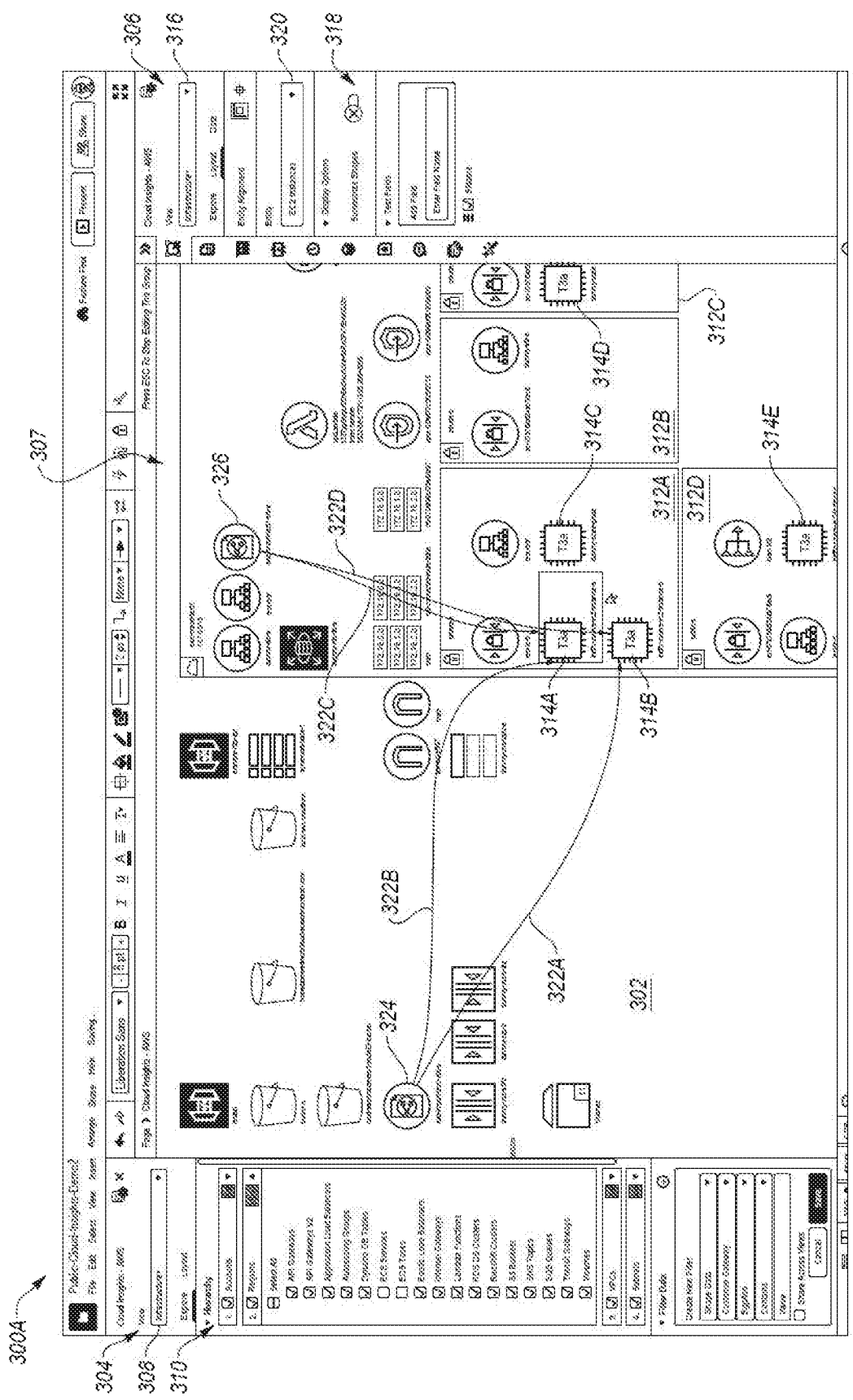
FIGS. 3A-3B include graphical representations of a user interface (UI) to generate graphical diagrams.
Figure 3B:
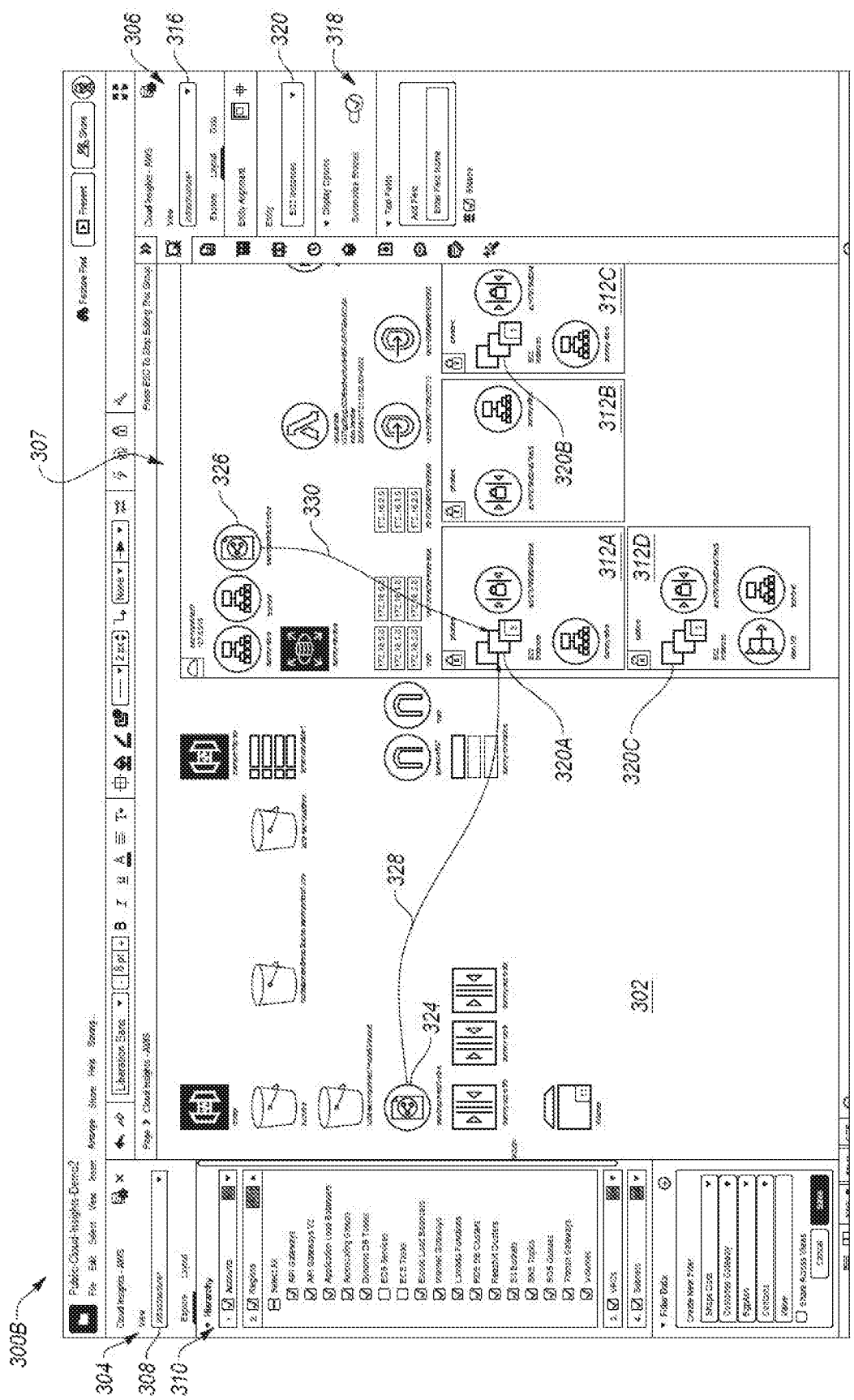

FIGS. 3A-3B include graphical representations 300A, 300B (collectively "graphical representations 300") of a UI to generate graphical diagrams, arranged in accordance with at least one embodiment described herein. The UI may be provided by the browser 128 and/or the diagram application 114 of FIG. 1. For instance, the browser 128 in cooperation with the diagram application 114 may present the UI to a user through a display of the client device 104.

In FIGS. 3A-3B, the graphical representations 300 include a graphical drawing canvas 302, a first panel 304 to one side of the graphical drawing canvas 302, and a second panel 306 to an opposite side of the graphical drawing canvas 302. In other embodiments, the first and second panels 304, 306 may be positioned in other locations relative to the graphical drawing canvas 302, may be combined into a single panel, or may be expanded into three or more panels. For example, the second panel 306 may be omitted from the right side of the graphical drawing canvas 302 while retaining the first panel 304 on the left side of the graphical drawing canvas 302. Alternatively, the first panel 304 may be omitted from the left side of the graphical drawing canvas 302 while retaining the second panel 306 on the right side of the graphical drawing canvas 302.

In general, graphical drawings of structured source data may be displayed in the graphical drawing canvas 302. In FIGS. 3A-3B, the graphical drawing canvas 302 displays an example graphical drawing 307 that includes various graphical objects that represent nodes in underlying structured source data. The graphical objects in this example include various AWS icons to represent AWS nodes, such as application load balancers, NAT gateways, EC2 instances, API gateways, Lambda functions, and so on.

The panel 304 includes an input field 308 such as a dropdown list from which a particular view of structured source data may be selected. In the example of FIGS. 3A-3B, the selected view is "Infrastructure".

The panel 304 additionally includes an Explore tab and a Layout tab. The Explore tab has been selected in FIGS. 3A-3B and includes a hierarchy selection area 310 in which a user can turn on or off various hierarchy levels, or container levels, in the graphical diagram 307 shown in the graphical drawing canvas 302. In this example, the hierarchy selection area 310 includes container levels named Accounts, Regions, VPCs, and Subnets which can be turned on or off by checking or unchecking a corresponding box next to the corresponding container level. The hierarchy selection area 310 may also permit a user to specify which types of nodes the user desires to see at each container level, e.g., by selecting a dropdown arrow to display a list of all nodes at that container level which the user can select or deselect. In the example of FIGS. 3A-3B, the Regions container level list shows that the user has selected all nodes at the Regions container level except for ECS Services nodes and ECS Tasks nodes.

In the example of FIGS. 3A-3B, the VPC container level is turned on such that various containers 312A-312D at the VPC container level are shown with various graphical objects therein. For example, the container 312A includes graphical objects 314A-314C that represent EC2 nodes, the container 312C includes graphical object 314D that represents an EC2 node, and the container 312D includes graphical object 314E that represents an EC2 node.

The panel 306 includes an input field 316 that is the same as the input field 308 of the panel 304. The panel 306 also includes various tabs, including an Explore tab, a Layout tab, and a Data tab. The Explore tab and the Layout tab of the panel 306 may be the same as the corresponding tabs of the panel 304. The Layout tab has been selected in the panel 306 of FIGS. 3A-3B.

The Layout tab in FIGS. 3A-3B includes an example UI to group graphical objects for collapse. In particular, the Layout tab includes a button 318 that may be toggled between off (FIG. 3A) and on (FIG. 3B) to turn summarization off or on. The Layout tab additionally includes an input field 320 such as a dropdown list from which a particular type of resource may be selected to apply settings to. In this example, one of the settings that may be applied to the selected resource type is summarization. In particular, when the "EC2 Instances" or other resource type is selected in the input field 320, the button 318 may be toggled on or off to turn summarization of the "EC2 Instances" or other resource type on or off. When summarization is turned on for the selected type of resource, e.g., EC2 Instances, all graphical objects 314A-314E that represent nodes that have an entity type of EC2 Instance as illustrated in FIG. 3A are collapsed into a fewer number of summary graphical objects 320A-320C (hereinafter "summary graphical objects 320") as illustrated in FIG. 3B.

In another implementation, an input field such as the input field 320 may include a dropdown list from which a particular resource type as a value for a property may be selected for summarization. In this example, the particular resource type of "EC2 Instances" may be selected as the value of the entity (or resource) type property. When summarization is turned on for the entity type property having a value of EC2 Instance, all graphical objects 314A-314E that represent nodes that have an entity type of EC2 Instance as illustrated in FIG. 3A may be collapsed into a fewer number of summary graphical objects 320A-320C (hereinafter "summary graphical objects 320") as illustrated in FIG. 3B.

With the VPC container level turned on and summarization applied based on an entity type of EC2 Instance, a corresponding one of the summary graphical objects 320A-320C is included in each of the containers 312A, 312C, 312D that includes at least one of the graphical objects 314A-314E that represent EC2 instance nodes and in place of the graphical objects 314A-314E. For example, the graphical objects 314A-314C in the container 312A are collapsed to the summary graphical object 320A. The graphical object 314D, together with any other graphical objects that represent EC2 nodes in the container 312C, are collapsed to the summary graphical object 320B. The graphical object 314E, together with any other graphical objects that represent EC2 nodes in the container 312D, are collapsed to the summary graphical object 320C. If the VPC container level is turned off, e.g., in the hierarchy selection area 310, the containers 312A-312D may be removed from the graphical diagram 307 and a single summary graphical object may be displayed in place of the graphical objects 314A-314E of FIG. 3A or the summary graphical objects 320A-320C.

FIG. 3A additionally includes various connectors 322A-322D between graphical objects in the graphical diagram 307 to represent relationships between the underlying nodes. In particular, the connector 322A is connected between a graphical object 324 that represents a first load balancer node and the graphical object 314B that represents a first EC2 instance node to represent a connection between the first load balancer node and the first EC2 instance node. The connector 322B is connected between the graphical object 324 that represents the first load balancer node and the graphical object 314A that represents a second EC2 instance node to represent a connection between the first load balancer node and the second EC2 instance node. The connector 322C is connected between a graphical object 326 that represents a second load balancer node and the graphical object 314A that represents the second EC2 instance node to represent a connection between the second load balancer node and the second EC2 instance node. The connector 322D is connected between the graphical object 326 that represents the second load balancer node and the graphical object 314B that represents the first EC2 instance node to represent a connection between the second load balancer node and the first EC2 instance node.

When summarization is turned on, the connectors 322A-322D may be removed altogether.

Alternatively, where the connectors 322A-322D are coupled at one end to graphical objects 314A, 314B that are subject to summarization, the connectors 322A-322D may be replaced by connectors coupled at one end to the corresponding summary graphical object 320A when summarization is turned. For example, as illustrated in FIGS. 3A-3B, both the connector 322A and the connector 322B of FIG. 3A may be replaced by a connector 328 in FIG. 3B that couples the graphical object 324 to the summary graphical object 320A. Similarly, both the connector 322C and the connector 322D of FIG. 3A may be replaced by a connector 330 in FIG. 3B that couples the graphical object 326 to the summary graphical object 320A.

FIGS. 3A-3B illustrate one example UI in the Layout tab of the panel 306 to group graphical objects for collapse. Alternatively or additionally, graphical objects may be grouped for collapse by a user individually selecting each graphical object for inclusion in the group. For example, the user may select multiple graphical objects, e.g., by using a mouse to left click each of the graphical objects while a control key of a keyboard is depressed, to include in the group. The user may then provide input effective to group the selected graphical objects for collapse. For example, with all of the multiple graphical objects selected as a group, the user may use the mouse to right click on any of the graphical objects in the group to be presented with a UI that includes an option to group the selection for collapse.

The UI of FIGS. 3A-3B includes various example UI elements and an example arrangement of UI elements that provide a user with functionality to configure a graphical diagram such as the graphical diagram 307. The specific UI elements and their arrangement in FIGS. 3A-3B are representative of an arrangement of UI elements that may provide such functionality. Embodiments described herein may include or implement other UIs with other UI elements or arrangements of UI elements that may provide a user with the same, similar, or different functionality.

Figure 4:
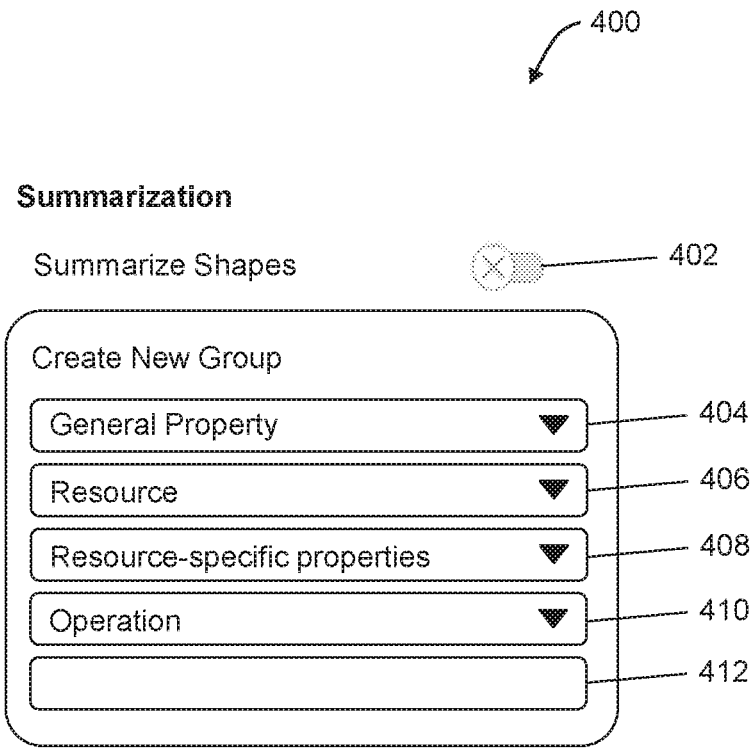
FIG. 4 includes an example UI to group graphical objects for collapse.

FIG. 4 includes another example UI 400 to group graphical objects for collapse, arranged in accordance with at least one embodiment described herein. The UI 400 of FIG. 4 may be included in, e.g., the panels 304, 306 of FIGS. 3A-3B instead of, in addition to, or as part of the Layout tab of FIGS. 3A-3B.

The UI 400 includes a button 402, similar to the button 318 of FIGS. 3A-3B, that may be toggled between off and on to turn summarization off or on. The UI 400 additionally includes input fields 404, 406, 408, 410, 412 that generally permit a user to select/input a property and optionally a value to use for summarization. For example, the input field 404 may include a dropdown list from which the user may select a general property or type of property to be used for summarization. Example general properties include generic shape data, tags, and custom formula.

Selection of the generic shape data general property may include as candidates for inclusion in a group graphical objects of any shape, e.g., that may be further narrowed by input received via one or more of the input fields 406, 408, 410, 412.

Selection of the tags general property may include as candidates for inclusion in a group graphical objects and/or underlying nodes in the structured data that have tags, which may be further narrowed by input received via one or more other input fields that may be the same as or different from the input fields 406, 408, 410, 412. For instance, the particular input fields following the input field 404 may be different or repurposed from those shown in FIG. 4 depending on which general property is selected via input field 404.

Selection of the custom formula general property may include as candidates for inclusion in a group graphical objects and/or underlying nodes in the structured data that satisfy a formula entered by the user. In this example, when the custom formula general property is selected, the input fields 406, 408, and 410 may be omitted from the UI 400 and the user may enter the formula in the input field 412. Examples of custom formulas include "InstanceType=t3a.nano" and "(InstanceType=t3a.nano) AND (Name contains 'prod' OR Name contains 'preProd')".

The input field 406 may include a dropdown list from which the user may select a particular one or more of multiple resources to select resource-specific properties from the input field 408. The input field 406 may have an "all" option to select all the resources in the input field 406. Example resources that may be selected from the input field 406 include EC2 instances, NAT Gateways, Lambda function, API Gateways, API Gateways V2, Accounts, Activities, All non-container items, Application Load Balancers, Autoscaling Groups, CloudFront Distributions, Customer Gateways, and Dynamo DB Tables among potentially others.

When the generic shape data general property is selected via input field 404, the input field 408 may include a dropdown list from which the user may select a particular one of multiple resource-specific properties of the resource(s) selected in the input field 406. Example resource-specific properties that may be selected from the input field 408 include status, architecture, name, apiKey Source, createdDate, description, id, minimumCompressionSize, policy, regionId, and version among potentially others. When the tags general property is selected via input field 404, the input field 408 may be repurposed to allow for selection of Tag keys present on the selected resource type (input field 406) where input field 412 may then be used to specify possible tag values for a given tag name.

The input field 410 may include a dropdown list from which the user may select an operation to apply to a value in the input field 412 to group graphical objects with the specified general property (input field 404), that are the specified resource (input field 406), with the specified resource-specific property (input field 408) that satisfies the operation on the value. Example operations include Is empty, Is not empty, Contains, Does not contain, Starts with, Ends with, Is greater than, and Is less than among potentially others. Some of the operations may not require a value in the input field 412, such as the Is empty and the Is not empty operations.

The input field 412 may include a text input field in which a user may input a value. If Contains is selected from the input field 410, all graphical objects of the specified resource (input field 406) that have a specified general property (input field 404) and a specified resource-specific property (input field 408) whose value includes the value input in the input field 412 may be grouped for collapse. If Does not contain is selected from the input field 410, all graphical objects of the specified resource (input field 406) that have a specified general property (input field 404) and a specified resource-specific property (input field 408) whose value does not include the value input in the input field 412 may be grouped for collapse.

If Is empty is selected from the input field 410, all graphical objects of the specified resource (input field 406) that have a specified general property (input field 404) and a specified resource-specific property (input field 408) without any value or that lack the specified resource-specific property altogether may be grouped for collapse. If Is not empty is selected from the input field 410, all graphical objects of the specified resource (input field 406) that have a specified general property (input field 404) and that have a specified resource-specific property (input field 408) with any value may be grouped for collapse.

If Starts with is selected from the input field 410, all graphical objects of the specified resource (input field 406) that have a specified general property (input field 404) and a specified resource-specific property (input field 408) with a value that starts with the value input in the input field 412 may be grouped for collapse. If Ends with is selected from the input field 410, all graphical objects of the specified resource (input field 406) that have a specified general property (input field 404) and a specified resource-specific property (input field 408) with a value that ends with the value input in the input field 412 may be grouped for collapse.

If Is greater than is selected from the input field 410, all graphical objects of the specified resource (input field 406) that have a specified general property (input field 404) and a specified resource-specific property (input field 408) with a value that is greater than the value input in the input field 412 may be grouped for collapse. If Is less than is selected from the input field 410, all graphical objects of the specified resource (input field 406) that have a specified general property (input field 404) and a specified resource-specific property (input field 408) with a value that is less than the value input in the input field 412 may be grouped for collapse.

Figure 5A:
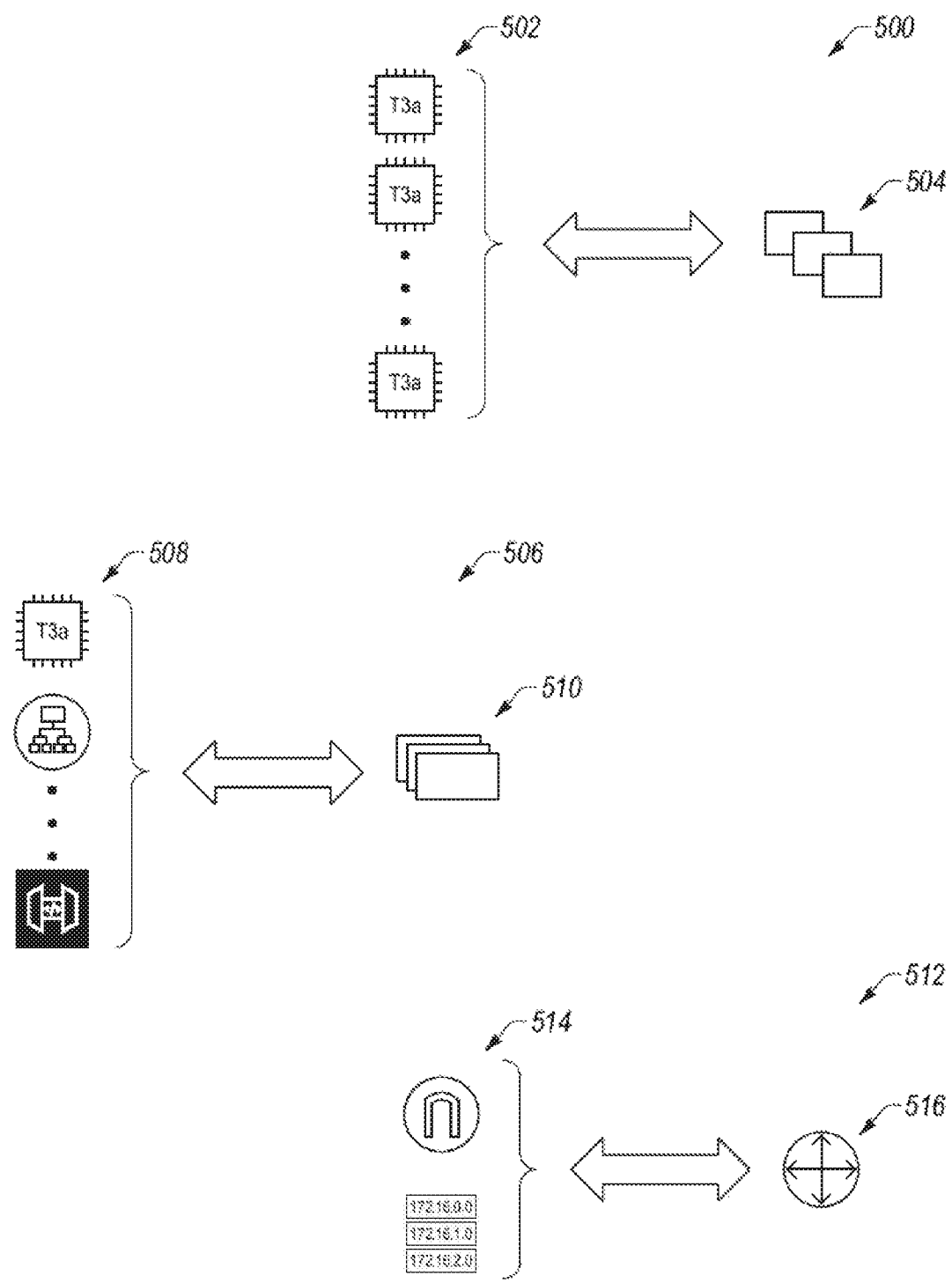
FIGS. 5A and 5B illustrate some example groups of graphical objects and corresponding summary graphical objects.

Any of a variety of icons may be used as summary graphical objects. FIG. 5A illustrates some example groups of graphical objects and corresponding summary graphical objects, arranged in accordance with at least one embodiment described herein.

In a first example 500, graphical objects 502 that represent EC2 instances are grouped together and may be collapsed to a summary graphical object 504 and/or the summary graphical object 504 may be expanded to the graphical objects 502, as indicated by the bracket and the bidirectional arrow between the graphical objects 502 and the summary graphical object 504. In the first example 500, the graphical objects 502 include standard AWS EC2 instance icons and the summary graphical object 504 includes a standard AWS group icon that represents a group of two or more EC2 instances. In particular, the standard AWS group icon includes a cascaded set of three shapes that is each generally the same shape and the same color as the standard AWS EC2 instance icons. More generally, where a standard icon representative of a particular group of nodes already exists, such standard icon may be used as the summary graphical object for the group of nodes.

In a second example 506, graphical objects 508 that represent disparate nodes are grouped together and may be collapsed to a summary graphical object 510 and/or the summary graphical object 510 may be expanded to the graphical objects 508. In the second example 506, the graphical objects 508 include standard AWS icons for the corresponding nodes and the summary graphical object 510 includes a default icon that represents a group of nodes that lacks a standard icon. In particular, the default icon includes a cascaded set of three rectangles. Other icons may be used as the default icon to represent a group of nodes that lacks a standard icon. More generally, where a standard icon representative of a particular group of nodes does not exist, a default icon may be used as the summary graphical object for the group of nodes.

In a third example 512, graphical objects 514 that represent an internet gateway node and a route table node are grouped together and may be collapsed to a summary graphical object 516 and/or the summary graphical object 516 may be expanded to the graphical objects 514. In the third example 512, the graphical objects 514 include standard AWS icons for the internet gateway node and the route table node. The combination of the internet gateway node and the route table node is semantically meaningful, e.g., the combination forms a router. Thus, the summary graphical object 516 includes the standard AWS icon for a router. More generally, where the combination of a particular group of nodes forms a semantically meaningful node that has a standard icon, the standard icon representative of the semantically meaningful node may be used as the summary graphical object for the group of nodes.

Figure 5B:
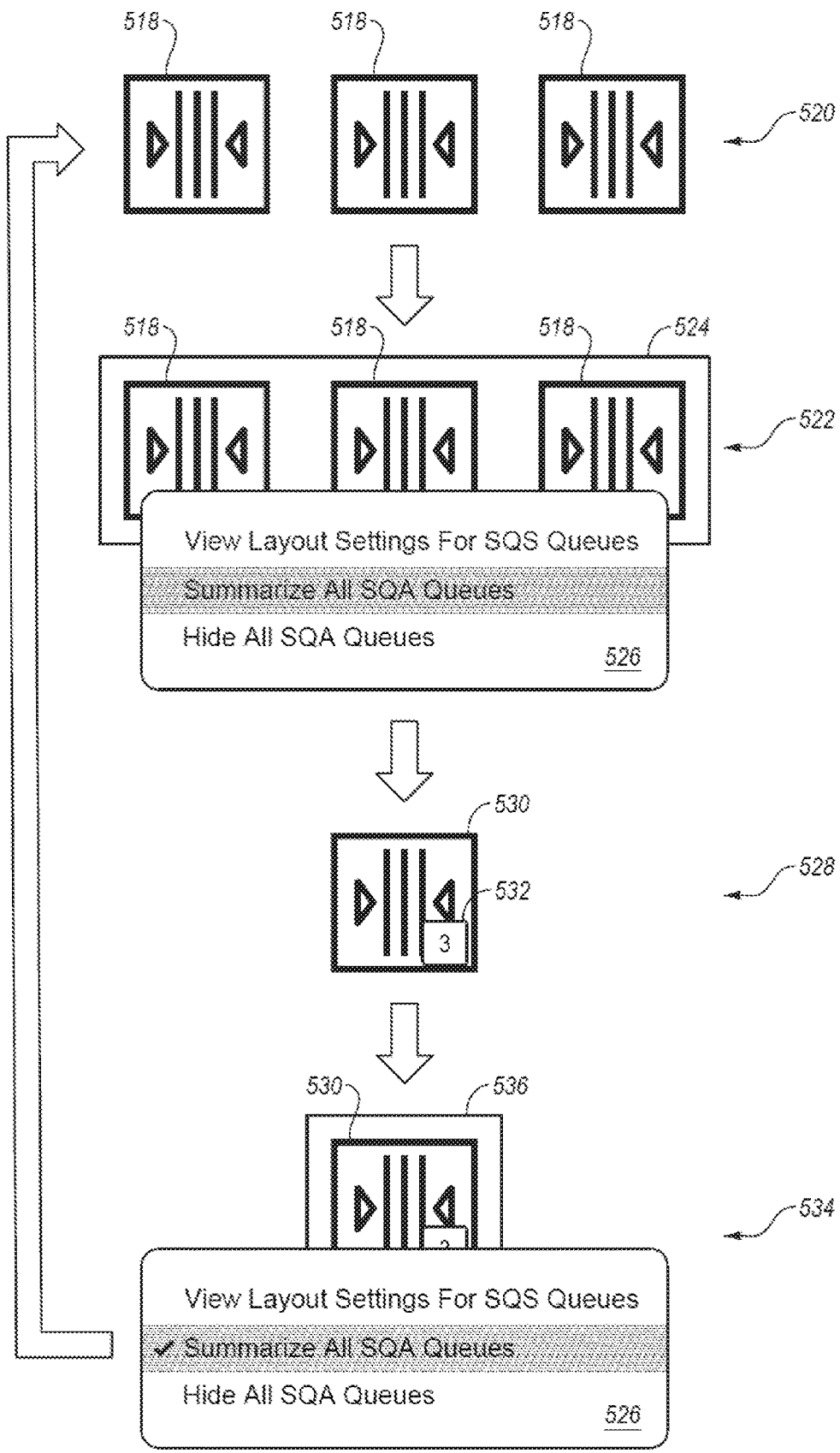

FIG. 5B illustrates another example group of graphical objects and corresponding summary graphical object, arranged in accordance with at least one embodiment described herein. FIG. 5B additionally illustrates an example grouping/summarizing and ungrouping/expanding method.

In more detail, FIG. 5B illustrates graphical objects 518 that include three of the same type of node, specifically, three SQS Queue nodes, which are initially ungrouped as indicated at step 520. The three graphical objects 518 may be grouped for collapse by a user selecting the three graphical objects 518, e.g., by using a mouse to left click each of the graphical objects 518 while a control key of a keyboard is depressed, to include in the group.

As indicated at step 522, a visual cue, such as an outline 524 around the graphical objects 518, highlighting, or other visual cue, may be displayed around the selected graphical objects 518 to indicate that the graphical objects 518 have been collectively selected. As also indicated at step 522, the user may then provide input effective to group the selected graphical objects 518 for collapse. For example, with all of the graphical objects 518 selected, the user may use the mouse to right click on any of the selected graphical objects 518 to be presented with a UI 526 that includes an option to group the selection for collapse. In particular, the UI 526 of FIG. 5B includes an option to "Summarize all SQS Queues" since all of the selected graphical objects 518 are SQS Queue nodes. More generally, the UI 526 may include an option to summarize the selected graphical objects.

As indicated at 528, receiving the input effective to group the selection for collapse, e.g., receiving input from the user left clicking the "Summarize all SQS Queues" in the UI 526 at step 522, may collapse the graphical objects 518 to a summary graphical object 530. In this example, the summary graphical object 530 is the same as each of the graphical objects 518 individually. More generally, where all selected graphical objects in a group are the same type, the icon used as a corresponding summary graphical object for the group may in some embodiments be the same as the icon used for the selected graphical objects of that type.

FIG. 5B additionally illustrates an example badge 532 that may be placed on the summary graphical object 530 to indicate that it is a summary graphical object that represents some grouped graphical objects. In this example, the badge 532 includes a number "3" indicating the number of graphical objects 518 in the group represented by the summary graphical object 530. In other embodiments, badges may be omitted from summary graphical objects.

In general, the summary graphical object 530 may be expanded back to the graphical objects 518 by reversing the process from steps 520, 522, and 528. For example, at step 534, the summary graphical object 530 may be selected as indicated by an outline 536 around the summary graphical object 530, highlighting, or other visual cue. The summary graphical object 530 may be selected by the user left or right clicking on the summary graphical object or providing other suitable input. As further indicated at step 534, the user may then provide input effective to expand the selected summary graphical object 530. For example, with the summary graphical object 530 selected, the user may use the mouse to right click on the selected summary graphical object 530 to be presented with the UI 526 that includes an option to expand the summary graphical object 530. In particular, the UI 526 of FIG. 5B includes the option to "Summarize all SQS Queues" which is shown as currently being on by a check mark or other visual cue. Selection of the "Summarize all SQS Queues" when it is already turned on may turn the option off to expand the summary graphical object 530 into the graphical objects 518.

Figure 6:
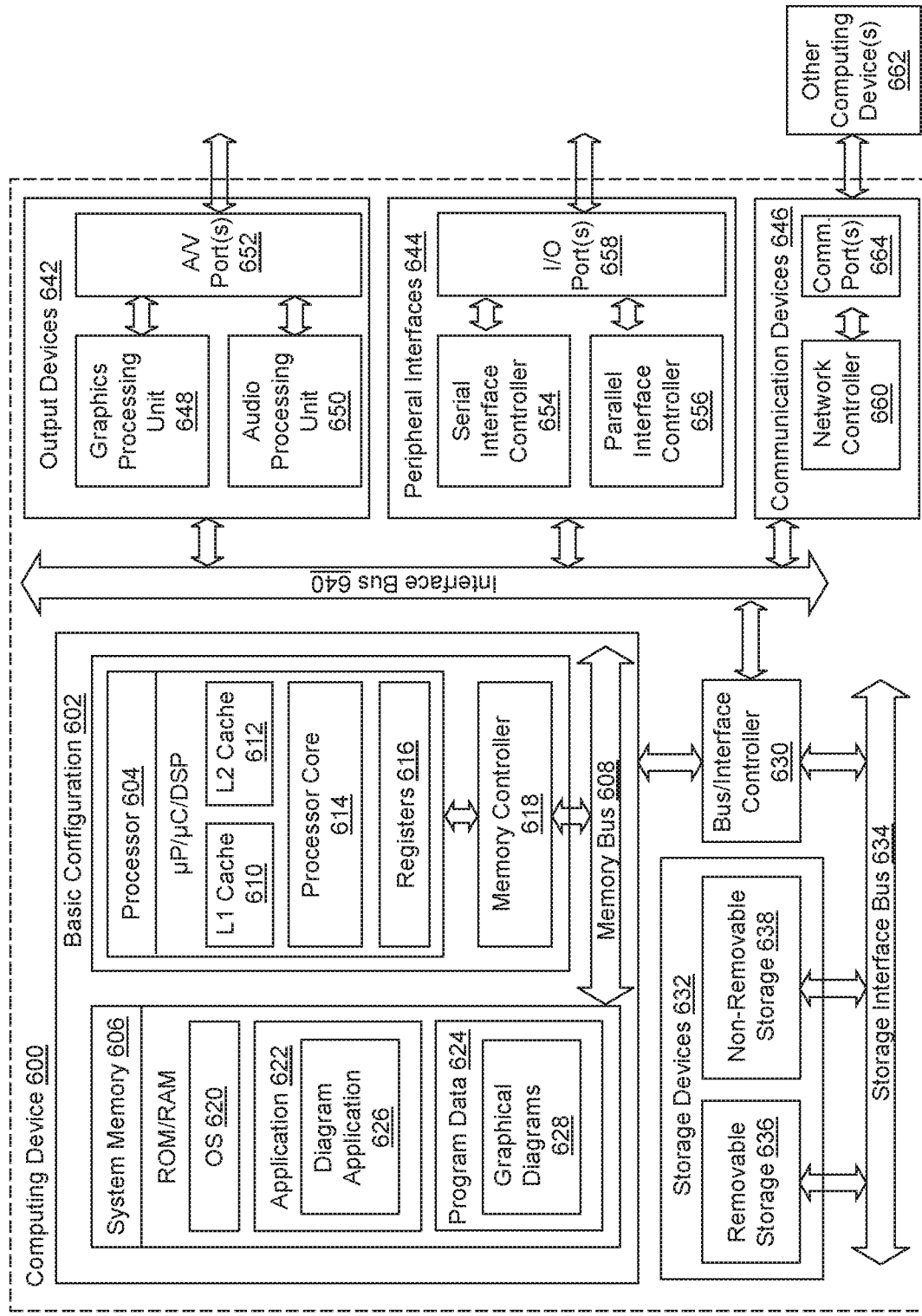
FIG. 6 is a block diagram illustrating an example computing device that is arranged to generate and display graphical diagrams, collapse multiple graphical objects into fewer summary graphical objects, and expand summary graphical objects into more graphical objects, all arranged in accordance with at least one embodiment described herein.

FIG. 6 is a block diagram illustrating an example computing device 600 that is arranged to generate and display graphical diagrams, collapse multiple graphical objects into fewer summary graphical objects, and expand summary graphical objects into more graphical objects, arranged in accordance with at least one embodiment described herein. The computing device 600 may include, be included in, or otherwise correspond to either or both of the server 102 or the client devices 104, 106, 108 of FIG. 1. In a basic configuration 602, the computing device 600 typically includes one or more processors 604 and a system memory 606. A memory bus 608 may be used to communicate between the processor 604 and the system memory 606.

Depending on the desired configuration, the processor 604 may be of any type including, but not limited to, a microprocessor (µP), a microcontroller (µC), a digital signal processor (DSP), or any combination thereof. The processor 604 may include one or more levels of caching, such as a level one cache 610 and a level two cache 612, a processor core 614, and registers 616. The processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may include an internal part of the processor 604.

Depending on the desired configuration, the system memory 606 may be of any type including volatile memory (such as RAM), nonvolatile memory (such as ROM, flash memory, etc.), or any combination thereof. The system memory 606 may include an operating system 620, one or more applications 622, and program data 624. The application 622 may include a diagram application 626 that is arranged generate and display graphical diagrams, collapse multiple graphical objects into fewer summary graphical objects, and/or expand summary graphical objects into more graphical objects, as described herein. The diagram application 626 may include, be included in, or otherwise correspond to the application 114 of FIG. 1. The program data 624 may include graphical diagrams 626 (which may include, be included in, or otherwise correspond to the graphical diagrams 126 of FIG. 1) as is described herein, structured source data collections (such as structured source data 120 of FIG. 1), models of structured source data (such as models 122 of FIG. 1) and/or other diagram application data. In some embodiments, the application 622 may be arranged to operate with the program data 624 on the operating system 620 such that one or more methods may be provided as described herein.

The computing device 600 may have additional features or functionality, and additional interfaces to facilitate communications between the basic configuration 602 and any involved devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 606, the removable storage devices 636, and the non-removable storage devices 638 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 600. Any such computer storage media or non-transitory computer-readable media may be part of the computing device 600.

The computing device 600 may also include an interface bus 640 to facilitate communication from various interface devices (e.g., output devices 642, peripheral interfaces 644, and communication devices 646) to the basic configuration 602 via the bus/interface controller 630. The output devices 642 include a graphics processing unit 648 and an audio processing unit 650, which may be configured to communicate to various external devices such as a display or speakers via one or more A/V ports 652. Diagrams, flowcharts, organizational charts, connectors, and/or other graphical objects generated by the diagram application 626 may be output through the graphics processing unit 648 to such a display. The peripheral interfaces 644 include a serial interface controller 654 or a parallel interface controller 656, which may be configured to communicate with external devices such as input devices (e.g., keyboard, mouse, pen, voice input device, touch input device, etc.), sensors, or other peripheral devices (e.g., printer, scanner, etc.) via one or more I/O ports 658. Such input devices may be operated by a user to provide input to the diagram application 626, which input may be effective to, e.g., generate curved connectors, designate points as designated points of one or more curved connectors, relocate one or more designated points, and/or to accomplish other operations within the diagram application 626. The communication devices 646 include a network controller 660, which may be arranged to facilitate communications with one or more other computing devices 662 over a network communication link via one or more communication ports 664.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 600 may be implemented as a portion of a small-form factor portable (or mobile) electronic device such as a smartphone, a personal data assistant (PDA) or an application-specific device. The computing device 600 may also be implemented as a personal computer including tablet computer, laptop computer, and/or non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method to display a graphical diagram on a display device, the method comprising:
   displaying a plurality of graphical objects in a graphical drawing canvas on a display device, the plurality of graphical objects representing a plurality of data objects included in structured source data;

receiving, through an input device, first input effective to select a property of the plurality of data objects;

receiving, through the input device, second input effective to group first and second graphical objects of the plurality of graphical objects based on the selected property; and replacing the first and second graphical objects with a summary graphical object in the graphical drawing canvas on the display device in response to receiving the second input, wherein:

the first and second graphical objects represent first and second data objects of the plurality of data objects; and a value of the selected property of each of the first and second data objects is the same.

2. The computer-implemented method of claim 1, further comprising:

receiving third input effective to expand the summary graphical object; and replacing the summary graphical object in the graphical drawing canvas with the first and second graphical objects in response to receiving the third input.

3. The computer-implemented method of claim 1, wherein:

the plurality of graphical objects further includes a third graphical object not grouped with the first and second graphical objects;

prior to replacement of the first and second graphical objects with the summary graphical object, the first graphical object is coupled by a connector to the third graphical object in the graphical drawing canvas; and the method further comprises replacing the connector between the first graphical object and the third graphical object with a connector between the summary graphical object and the third graphical object in the graphical drawing canvas.

4. The computer-implemented method of claim 1, wherein:

the first graphical object includes first conditional formatting; and replacing the first and second graphical objects with the summary graphical object in the graphical drawing canvas comprises applying the first conditional formatting to the summary graphical object.

5. The computer-implemented method of claim 4, wherein:

the second graphical object includes second conditional formatting; and replacing the first and second graphical objects with the summary graphical object in the graphical drawing canvas further comprises applying the second conditional formatting to the summary graphical object such that the summary graphical object has both the first and second conditional formatting.

6. The computer-implemented method of claim 1, wherein:

the plurality of graphical objects further includes third and fourth graphical objects;

the graphical diagram includes first and second containers;

the first and second graphical objects are positioned within the first container;

the third and fourth graphical objects are positioned within the second container;

the second input is further effective to group the third and fourth graphical objects together;

replacing the first and second graphical objects with the summary graphical object in the graphical drawing canvas comprises replacing the first and second graphical objects in the first container with a first summary graphical object in the first container; and the method further comprises replacing the third and fourth graphical objects in the second container with a second summary graphical object in the second container.

7. The computer-implemented method of claim 6, further comprising:

receiving container input effective to turn off a container level of the first and second containers such that they are removed from the graphical diagram; and replacing the first and second summary graphical objects with a single summary graphical object.

8. The computer-implemented method of claim 6, further comprising:

receiving first container input effective to turn off a container level of the first and second containers such that they are removed from the graphical diagram;

receiving second container input effective to turn on a container level of third and fourth containers such that they are included in the graphical diagram, wherein the first and third graphical objects belong to the third container and the second and fourth graphical objects belong to the fourth container; and displaying a third summary graphical object in the third container that represents the first and third graphical objects and a fourth summary graphical object in the fourth container that represents the second and fourth graphical objects.

9. A non-transitory computer-readable medium having computer-readable instructions stored thereon that are executable by a processor to perform or control performance of operations comprising:

displaying a plurality of graphical objects in a graphical drawing canvas, the plurality of graphical objects representing a plurality of data objects included in structured source data;

receiving, through an input device, first input effective to select a property of the plurality of data objects;

in response to receiving the first input, grouping a first graphical object and a second graphical object of the plurality of graphical objects based on the selected property; and replacing the first and second graphical objects with a summary graphical object in the graphical drawing canvas in response to receiving the first input, wherein:

the first and second graphical objects represent first and second data objects of the plurality of data objects; and a value of the selected property of each of the first and second data objects is the same.

10. The non-transitory computer-readable medium of claim 9, the operations further comprising:

receiving second input effective to expand the summary graphical object; and replacing the summary graphical object in the graphical drawing canvas with the first and second graphical objects in response to receiving the second input.

11. The non-transitory computer-readable medium of claim 9, wherein:

the plurality of graphical objects further includes a third graphical object not grouped with the first and second graphical objects;

prior to replacement of the first and second graphical objects with the summary graphical object, the first graphical object is coupled by a connector to the third graphical object in the graphical drawing canvas; and the operations further comprise replacing the connector between the first graphical object and the third graphical object with a connector between the summary graphical object and the third graphical object in the graphical drawing canvas.

12. The non-transitory computer-readable medium of claim 9, wherein:

the first graphical object includes first conditional formatting; and replacing the first and second graphical objects with the summary graphical object in the graphical drawing canvas comprises applying the first conditional formatting to the summary graphical object.

13. The non-transitory computer-readable medium of claim 12, wherein:

the second graphical object includes second conditional formatting; and replacing the first and second graphical objects with the summary graphical object in the graphical drawing canvas further comprises applying the second conditional formatting to the summary graphical object such that the summary graphical object has both the first and second conditional formatting.

14. The non-transitory computer-readable medium of claim 9, wherein:

the plurality of graphical objects further includes third and fourth graphical objects;

the graphical diagram includes first and second containers;

the first and second graphical objects are positioned within the first container;

the third and fourth graphical objects are positioned within the second container;

the first input is further effective to group the third and fourth graphical objects together;

replacing the first and second graphical objects with the summary graphical object in the graphical drawing canvas comprises replacing the first and second graphical objects in the first container with a first summary graphical object in the first container; and the method further comprises replacing the third and fourth graphical objects in the second container with a second summary graphical object in the second container.

15. The non-transitory computer-readable medium of claim 14, the operations further comprising:

receiving container input effective to turn off a container level of the first and second containers such that they are removed from the graphical diagram; and replacing the first and second summary graphical objects with a single summary graphical object.

16. The non-transitory computer-readable medium of claim 14, the operations further comprising:

receiving first container input effective to turn off a container level of the first and second containers such that they are removed from the graphical diagram;

receiving second container input effective to turn on a container level of third and fourth containers such that they are included in the graphical diagram, wherein the first and third graphical objects belong to the third container and the second and fourth graphical objects belong to the fourth container; and displaying a third summary graphical object in the third container that represents the first and third graphical objects and a fourth summary graphical object in the fourth container that represents the second and fourth graphical objects.

17. A computer-implemented method to display a graphical diagram on a display device, the method comprising:

displaying a plurality of graphical objects in a graphical drawing canvas on a display device, the plurality of graphical objects representing a plurality of data objects included in structured source data;

receiving, through an input device, first input effective to select a property of the plurality of data objects;

receiving, through the input device, second input effective to group first and second graphical objects of the plurality of graphical objects based on the selected property, the plurality of graphical objects further including a subset of graphical objects that are unrelated to the first and second graphical objects and that are displayed in the graphical drawing canvas;

in response to receiving the second input, replacing the first and second graphical objects with a summary graphical object in the graphical drawing canvas on the display device while continuing to display the subset of graphical objects that are unrelated to the first and second graphical objects in the graphical drawing canvas;

receiving, through the input device, third input effective to expand the summary graphical object; and in response to receiving the third input, replacing the summary graphical object in the graphical drawing canvas with the first and second graphical objects while continuing to display the subset of graphical objects that are unrelated to the first and second graphical objects in the graphical drawing canvas.

18. A computer-implemented method to display a graphical diagram on a display device, the method comprising:

displaying a plurality of graphical objects in a graphical drawing canvas on a display device, the plurality of graphical objects representing a plurality of data objects included in structured source data, the plurality of graphical objects including a first graphical object including a first conditional formatting and a second graphical object including a second conditional formatting that is different from the first conditional formatting;

receiving, through an input device, first input effective to group the first graphical object and the second graphical object based on a property of the plurality of data objects; and replacing the first graphical object and the second graphical object with a summary graphical object in the graphical drawing canvas on the display device in response to receiving the first input, wherein:

replacing the first graphical object and the second graphical object with the summary graphical object in the graphical drawing canvas comprises applying both the first conditional formatting and the second conditional formatting to the summary graphical object.

19. The computer-implemented method of claim 18, wherein:

receiving the first input comprises receiving an individual selection of the first graphical object and an individual selection of the second graphical object; and the property comprises an indication of selection of each of the first and second graphical objects.

20. The computer-implemented method of claim 18, wherein:
- receiving the first input comprises receiving input effective to select the property;
- the first and second graphical objects represent first and second data objects of the plurality of data objects; and
- a value of the property of each of the first and second data objects is the same.

21. The computer-implemented method of claim 1, further comprising:
- displaying a plurality of graphical connectors in the graphical drawing canvas, the plurality of graphical connectors representing relationships between data objects of the plurality of data objects; and
- in response to receiving the second input, replacing the plurality of graphical connectors with a summary graphical connector in the graphical drawing canvas.

* * * * *